United States Patent [19]
Inoue

[11] Patent Number: 6,025,889
[45] Date of Patent: Feb. 15, 2000

[54] PROJECTION TYPE LIQUID CRYSTAL DISPLAY APPARATUS UTILIZING A HIGH THERMAL CONDUCTIVITY CONNECTING MEMBER

[75] Inventor: Shunsuke Inoue, Yokohama, Japan

[73] Assignee: Canon Kabushiki Kaisha, Tokyo, Japan

[21] Appl. No.: 09/178,499

[22] Filed: Oct. 26, 1998

[30] Foreign Application Priority Data

Oct. 27, 1997 [JP] Japan .................................... 9-294474

[51] Int. Cl.[7] ...................... G02F 1/1335; G03B 21/18
[52] U.S. Cl. .................................. 349/5; 353/56
[58] Field of Search ................... 353/52, 56, 61, 353/53; 349/5, 161

[56] References Cited

U.S. PATENT DOCUMENTS

| | | | |
|---|---|---|---|
| 5,170,194 | 12/1992 | Kurematsu et al. | ...................... 353/52 |
| 5,631,750 | 5/1997 | Minoura et al. | ............................. 349/5 |
| 5,701,165 | 12/1997 | Kubo et al. | .................................. 349/5 |
| 5,737,050 | 4/1998 | Takahara et al. | ....................... 349/122 |
| 5,767,924 | 6/1998 | Hiroki et al. | ................................ 349/5 |

*Primary Examiner*—William L. Sikes
*Assistant Examiner*—Heidi L. Eisenhut
*Attorney, Agent, or Firm*—Fitzpatrick, Cella, Harper & Scinto

[57] ABSTRACT

A projection type liquid crystal display apparatus comprises three light valves showing a same temperature level to eliminate color distortions at low cost without requiring a large space. Rays of light of R, G, and B from a light source are made to enter light valves of R, G and B respectively by way of reflector mirrors and field lenses for R, G and B and modulated by the light valves before they are combined to produce an image, which image is then projected onto a screen by means of a projection lens group. The liquid crystal light valves are connected with each other by way of a high thermal conductivity sheet member, which is held in contact with the rear surface of each of the liquid crystal light valves.

9 Claims, 6 Drawing Sheets

DIRECTION OF INCIDENCE OF LIGHT FROM LIGHT SOURCE (TO DRIVING CIRCUIT)

(TO DRIVING CIRCUIT)

PROJECTION TYPE LIQUID CRYSTAL DISPLAY APPARATUS UTILIZING A HIGH THERMAL CONDUCTIVITY CONNECTING MEMBER

BACKGROUND OF THE INVENTION

1. Field of the Invention

This invention relates to a projection type liquid crystal display apparatus and, more particularly, it relates to a projection type liquid crystal display apparatus comprising a plurality of liquid crystal light valves.

2. Related Background Art

In recent years, projection type liquid crystal display apparatus capable of displaying high definition bright images have been developed and are popularly used as presentation tools for business applications. Such projection type liquid crystal display apparatus typically comprise three liquid crystal panels of the three primary colors of red (R), green (G) and blue (B) particularly when they have a large number of pixels and adapted to display highly bright images.

FIG. 5 of the accompanying drawings schematically illustrates a typical projection type liquid crystal display apparatus comprising three liquid crystal panels. The apparatus also comprises transmission type liquid crystal light valves. Referring to FIG. 5, cabinet 101 contains a light source 102 for converging rays of light from a light emitting tube containing halide or xenon therein and adapted to emit collimated light and six mirrors for separating the light from the light source into rays of light of R, G and B and combining them appropriately (including a B reflector mirror 103 for selectively reflecting B light, a first R reflector mirror 104 for selectively reflecting R light, a first reflector mirror 105, a second reflector mirror 106, a second R reflector mirror 107 for selectively reflecting R light and a G reflector mirror for 108 selectively reflecting G light) which illuminate an R light valve 109, a G light valve 110 and a B light valve 111 with rays of light of R, G and B respectively. The rays of light modulated by the respective light valves are combined to produce an image, which is then enlarged by a lens group 112 and projected onto an external screen 113. In a projection type liquid crystal display apparatus, the light source 102 emits a large quantity of light emitted per unit time and highly concentrated energy of light that amounts to a million luxes will be made to pass through each of the light valves to raise the temperature of the latter, which will then have to be cooled typically by means of an air cooling fan 114. On the other hand, each of the light valves 115 may have to be provided with a heater 115 to raise its temperature in order to improve its responsivity when it is operating at low temperature. Additionally, since the quantities of light entering the respective light valves of R, G and B differ from each other, the temperature rise may differ among the light valves. In other words, the graph of FIG. 6 showing the relationship between the liquid crystal transmittance and the applied voltage of any of the liquid crystal light valves will generally shift to the lower voltage side as the temperature of the light valve rises. For example, the relationship may shift from that of the solid line in FIG. 6 to that of the broken line. Furthermore, since the temperature generally differs among the light valves of the three different colors, the transmittance will also differ among the light valves as T1 and T2 in FIG. 6 for a same applied voltage V. This will result in color distortions of the displayed image. Such color distortions can become remarkable particularly when the quantity of light emitted from the light source gradually rises over several minutes after turning on the power switch or when the ambient temperature surrounding the apparatus changes dramatically. With a known technique for dealing with this problem, each of the light valves is provided with a heater 115 or with a temperature sensor 116 and a heater and the temperature of the light valve is controlled by a controller 117. It is also possible to control the temperature of the light valve by means of a Peltier device (not shown). However, such known temperature control techniques are costly and provide an obstacle to the attempt of reducing the cost of manufacturing liquid crystal display apparatus.

As discussed above, with known projection type liquid crystal display apparatus comprising a plurality of liquid crystal light valves, the latter show temperature difference depending on their colors to give rise to color distortions.

The problem of color distortions becomes remarkable particularly when the quantity of light emitted from the light source gradually rises after turning on the power switch or when the ambient temperature surrounding the apparatus changes dramatically.

The use of a temperature controller, a temperature sensor, a heater and/or a Peltier device for controlling the temperature of each of the light valves, however, results in a large and costly display apparatus.

SUMMARY OF THE INVENTION

In view of the above identified problems, it is therefore the object of the present invention to provide a projection type liquid crystal display apparatus comprising three light valves for the three primary colors of R, G and B that are made to show a same temperature level and hence free from color distortions.

Another object of the present invention is to provide a projection type liquid crystal display apparatus comprising a plurality of polymer dispersion type or polymer network type liquid crystal light valves that is improved in terms of color distortions.

According to the invention, the above objects and other objects of the invention are achieved by providing a projection type liquid crystal display apparatus comprising a plurality of liquid crystal light valves and a light source for emitting light to the light valves, a plurality of different beams of light modulated respectively by said light valves being projected and focused to display images, characterized in that said plurality of liquid crystal light valve are connected with each other by way of a high thermal conductivity member.

Preferably, the high thermal conductivity member is a sheet member.

Preferably, the plurality of liquid crystal light valves are of a reflection type adapted to reflect light from the light source and the high thermal conductivity member is held in contact with the rear surface or the surface opposite to the surface adapted to reflect light from the light source of each of the liquid crystal light valves.

Preferably, the liquid crystal light valves have a structure obtained by dispersing liquid crystal into a polymer network or dispersing granular liquid crystal into a polymeric substance. Thus, according to the invention, the plurality of liquid crystal light valves of a projection type liquid crystal display apparatus are made to show a same temperature level within a very short period of time to eliminate any temperature difference among them and hence color distortions. Particularly, the effect of eliminating temperature difference and color distortions is remarkable to reduce the cost and the space of the anti-color-distortion arrangement when the high thermal conductivity member is made of a sheet of metal or a high thermal conductivity polymer material.

DETAILED DESCRIPTION OF THE PREFERRED EMBODIMENTS

Now, the present invention will be described in greater detail by referring to the accompanying drawings that illustrate preferred embodiments of the invention.

[First Embodiment]

Figure 1A:
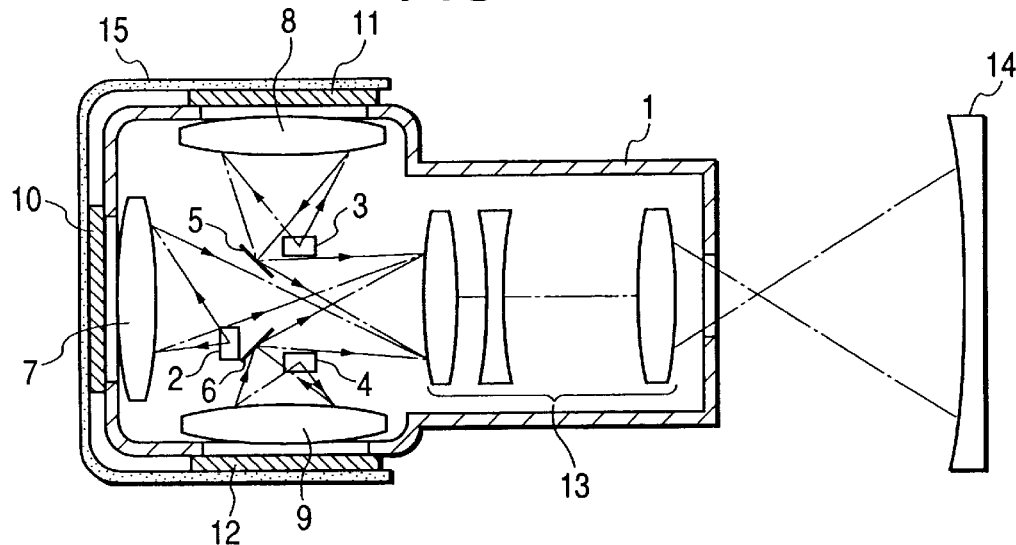
FIGS. 1A and 1B are a schematic cross sectional side view and a schematic perspective view of a first embodiment of projection type liquid crystal display apparatus according to the invention.
Figure 1B:
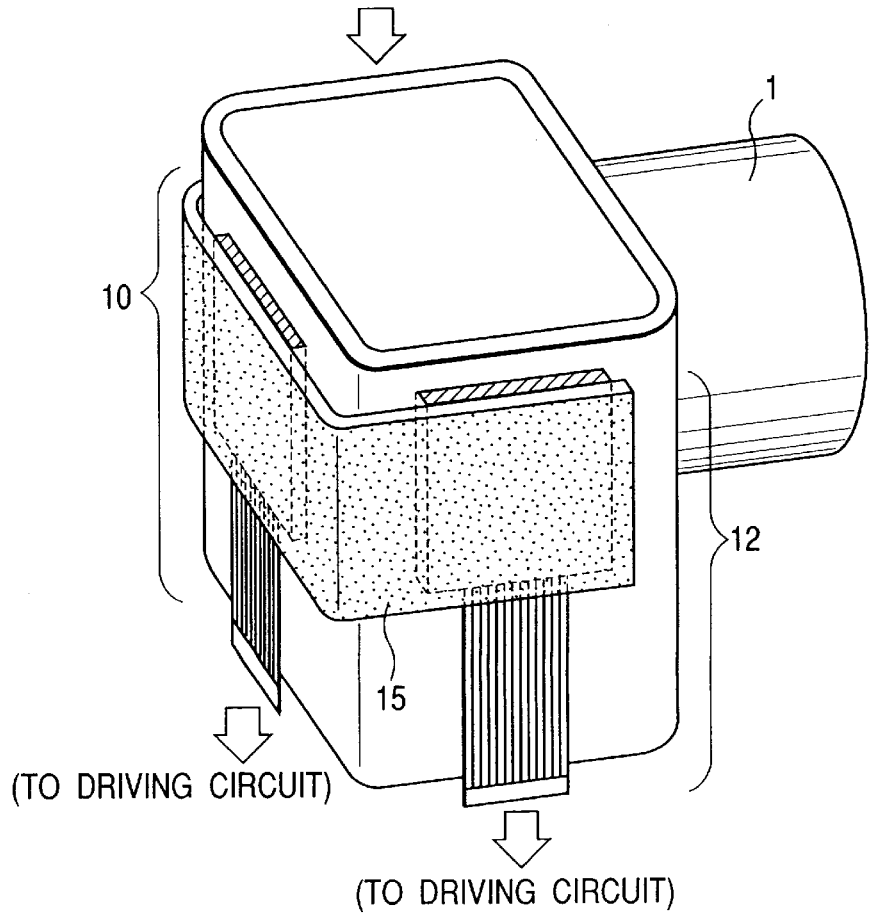

FIGS. 1A and 1B schematically illustrate a first embodiment of projection type liquid crystal display apparatus according to the invention. FIG. 1A is a schematic cross sectional view and FIG. 1B is a schematic perspective view. FIG. 1A shows the embodiment in cross section, putting stress on the optical system thereof and omitting for the purpose of simplification the drive circuit of the liquid crystal light valves, the power supply circuit and other electric components as well as mechanical parts that are necessary for the embodiment. It will be appreciated that the embodiment is a projection type liquid crystal display apparatus comprising three reflection type liquid crystal light valves.

Cabinet 1 contains therein a G light reflector mirror 2, a first R light reflector mirror 3 and a first B light reflector mirror 4 as components of the reflective spectral optical system of the embodiment for reflecting the rays of light of the respective colors of R, G and B obtained by separating the light emitted from the light source, which reflector mirrors are adapted to reflect the rays of light into a G field lens 7, an R field lens 8 and a B field lens 9 respectively. The rays of light of the three colors emitted from the light source are collimated by the field lenses before entering the respective light valves 10, 11, 12 perpendicularly. A video signal is transmitted to each of the light valves by means of a drive circuit (not shown) to modulate the rays of light from the light source. The rays of light reflected by the light valves are then transmitted to a projection lens group 13 by way of the respective field lenses 7, 8 and 9, where they are combined to produce an image, which is enlarged by the lens group 13 before projected onto an external screen 14. At this stage, rays of light of R and B are reflected by respective second reflector mirrors 5 and 6.

The light valves of the three colors are connected with each other at the back side thereof by means of a high thermal conductivity sheet 15 (graphite sheet in this embodiment) so that the light valves are made to show a same temperature level in a very short period of time.

FIG. 1B is a schematic perspective view of the embodiment that is turned upside down to show how the graphite sheet 15 is fitted in position.

A typical example of graphite sheet that can be used for this embodiment is "Panasonic Graphite Sheet" available from Matsushita Electric Industrial. This graphite sheet is a sheet having a thickness of 0.1 mm and obtained by graphitizing polymer film. It shows anisotropy in terms of thermal conductivity and hence preferably processed to align the high thermal conductivity direction of the sheet with a direction parallel to the surface of FIG. 1A. The thermal conductivity of the sheet in this direction is 700W/(m·K) and a half times greater than that of a copper sheet and is easily processible to meet the requirements of the sheet 15, although a copper sheet subjected to a bending process can also satisfactorily be used for this embodiment. Other materials that can be used for the sheet 15 of this embodiment include aluminum, stainless steel and other less expensive metals.

In this embodiment of liquid crystal display apparatus, the temperature of all the liquid crystal light valves is controlled to ambient temperature +(10° C.±1° C.) in normal operation so that no color distortions will be visually observed on the image displayed on the screen of the display apparatus throughout its display operation including several minutes immediately after turning on the power switch when temperature rises to often give rise color distortions.

It should be noted that the rate of temperature rise in normal operation of the apparatus can vary depending on the spatial arrangement of the components, the dimensions of the space in the apparatus and the cooling capacity of the fans provided in the apparatus and other factors for a same optical system.

The relative positions of the light valves of the three primary colors of R, G and B of the embodiment are not limited to those illustrated and may be arranged differently without departing from the scope of the present invention.

For this embodiment, each of the liquid crystal light valves 10, 11 and 12 is realized by dispersing liquid crystal into a polymer network, which is then sandwiched by a pair of substrates. The liquid crystal gives rise to a "scattering state" where the polymer and the liquid crystal show different refractive indexes depending on the applied voltage and a "transmissive state" where the polymer and the liquid crystal do not show any difference in the refractive index so that it is particularly suited for liquid crystal light valves to be used in liquid crystal display apparatus capable of displaying bright images without using a deflecting plate.

The light valves of this embodiment comprising the above described liquid crystal shows a relationship between the liquid crystal transmittance and the applied voltage that has a temperature dependency of about −0.05 V/K, which is a coefficient determined by the material and greater than that of TN (twisted nematic) mode liquid crystal. Therefore, the temperature equalizing method of this invention is highly effective for producing a display apparatus adapted to display bright images and realized by using polymer network type liquid crystal light valves as in the case of this embodiment.

However, it will be appreciated that the use of reflection type liquid crystal light valves comprising TN liquid crystal is also effective for the purpose of the invention.

A projection type liquid crystal display apparatus according to the invention may comprise two liquid crystal light valves instead of three. Additionally, the effect of the present invention will be more remarkable when the light valves of the three primary colors are separated further by arranging them in a fashion not specifically described here.

[Second Embodiment]

Figure 2:
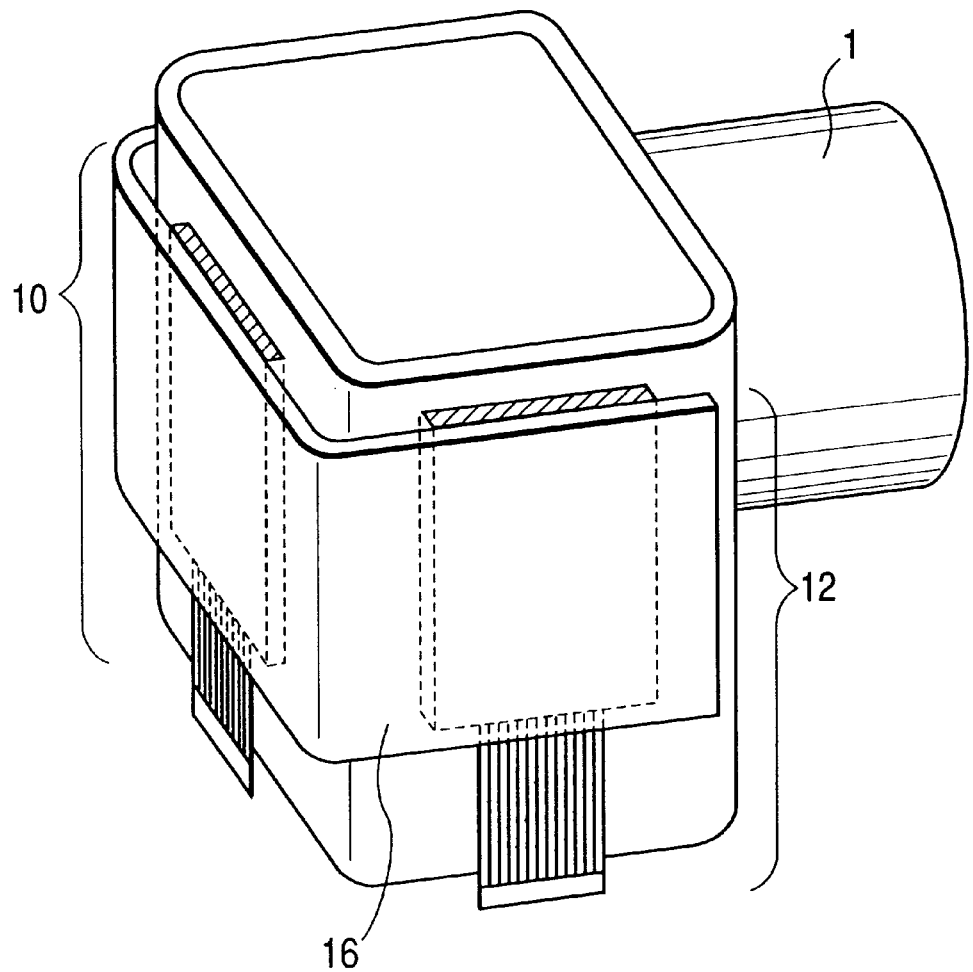
FIG. 2 is a schematic perspective view of a second embodiment of projection type liquid crystal display apparatus according to the invention.

FIG. 2 schematically illustrates a second embodiment of the invention. This embodiment has an optical system perfectly identical with that of the first embodiment and differs from the first embodiment only in the arrangement of the high thermal conductivity member.

The high thermal conductivity member of this embodiment is a U-shaped aluminum plate 16 bonded to the rear surface of each of the light valves. All the components other than the aluminum plate 16 are identical with their counterparts of the first embodiment of FIGS. 1A and 1B in terms of function and hence will be denoted respectively by the same reference symbols.

While the gap between the aluminum plate 16 and the light valves is preferably filled with thermally highly conductive paste or an adhesive agent containing a thermally conductive filler material, they may be put together by means of screws if they have a plane surface that allows them to contact with each other satisfactorily.

While the aluminum plate 16 has a thickness of about 2 mm and hence is less advantageous if compared with the sheet of the first embodiment in terms of the space occupied by it, it operates satisfactorily for the purpose of the invention.

Additionally, the use of an adhesive agent can eliminate a costly and cumbersome smoothing operation for equalizing the temperature of the light valves.

[Third Embodiment]

Figure 3:
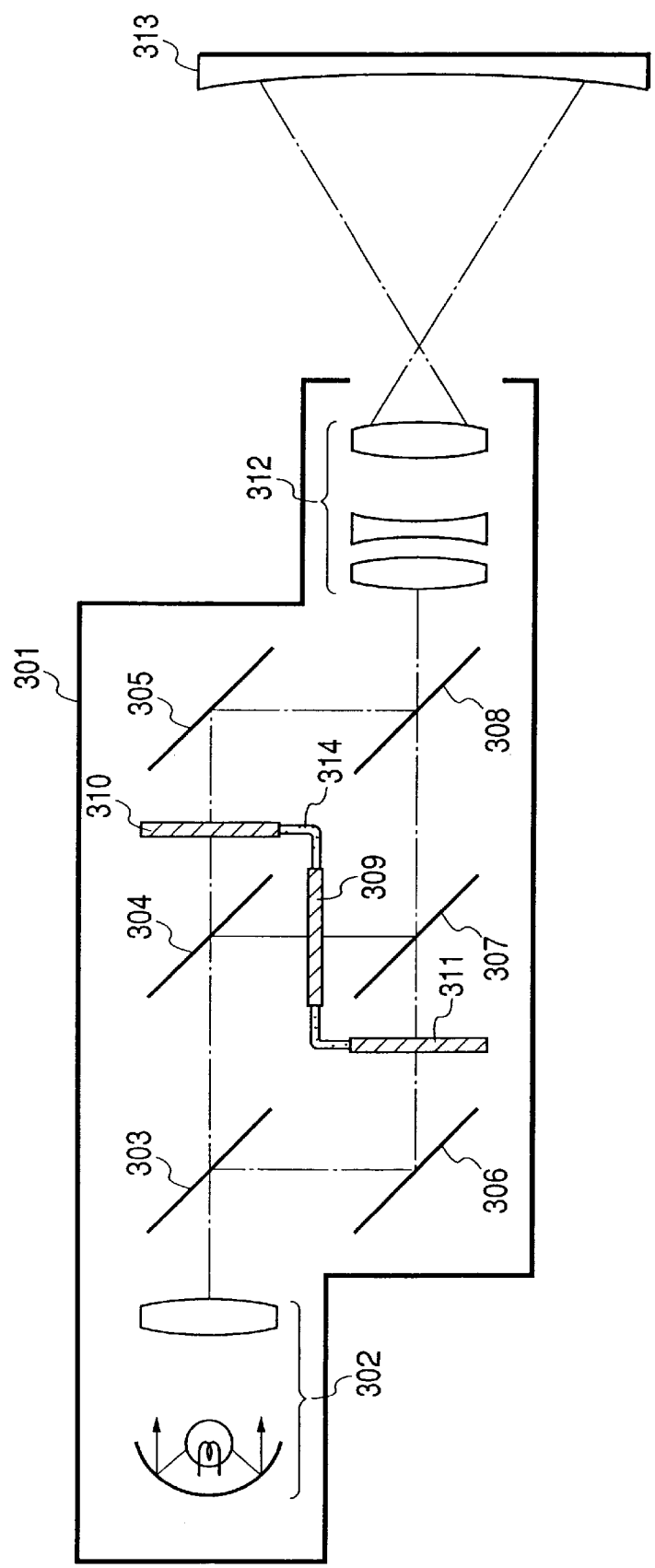
FIG. 3 is a schematic cross sectional side view of a third embodiment of projection type liquid crystal display apparatus according to the invention.
Figure 4A:
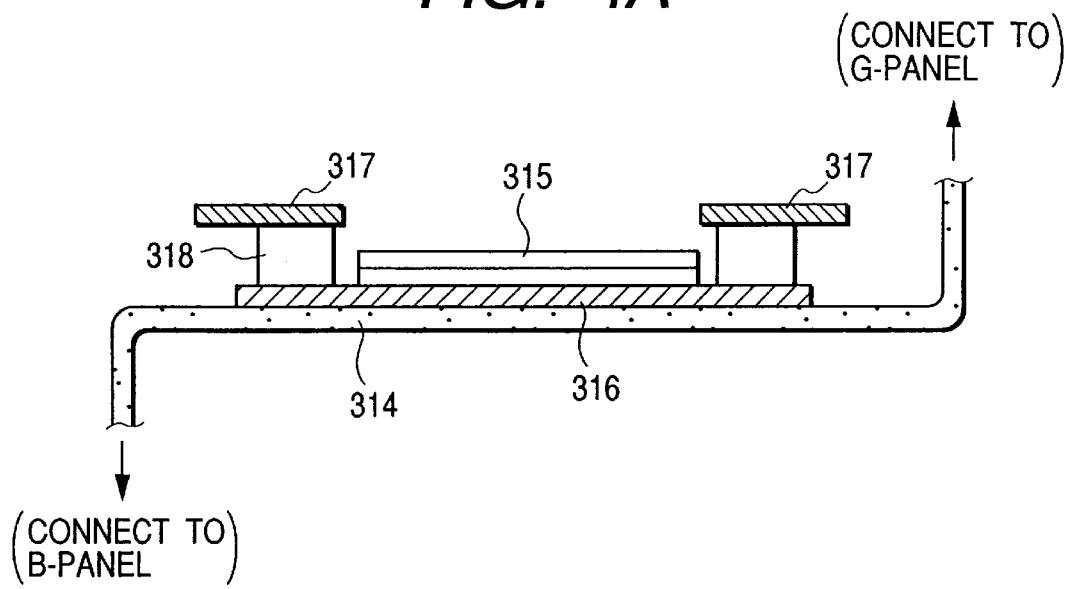
FIGS. 4A and 4B are enlarged schematic side view and plan view of the third embodiment of projection type liquid crystal display apparatus, showing part of the light valves.
Figure 4B:
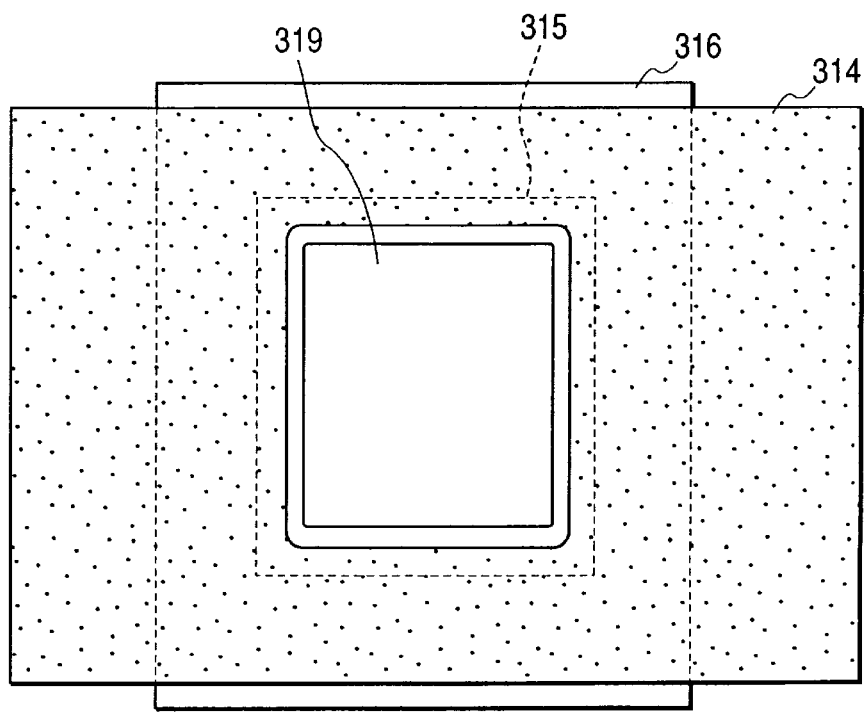
Figure 5:
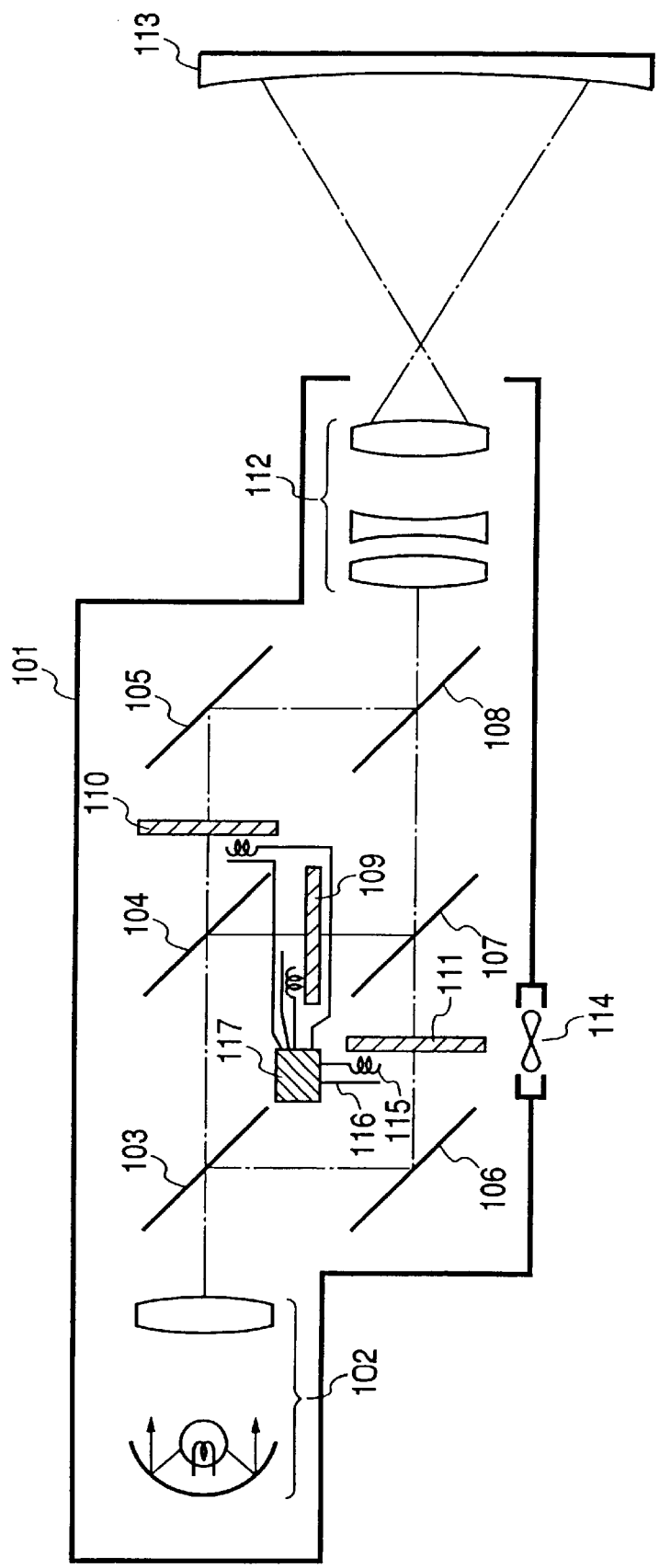
FIG. 5 is a schematic cross sectional side view of a known projection type liquid crystal display apparatus.
Figure 6:
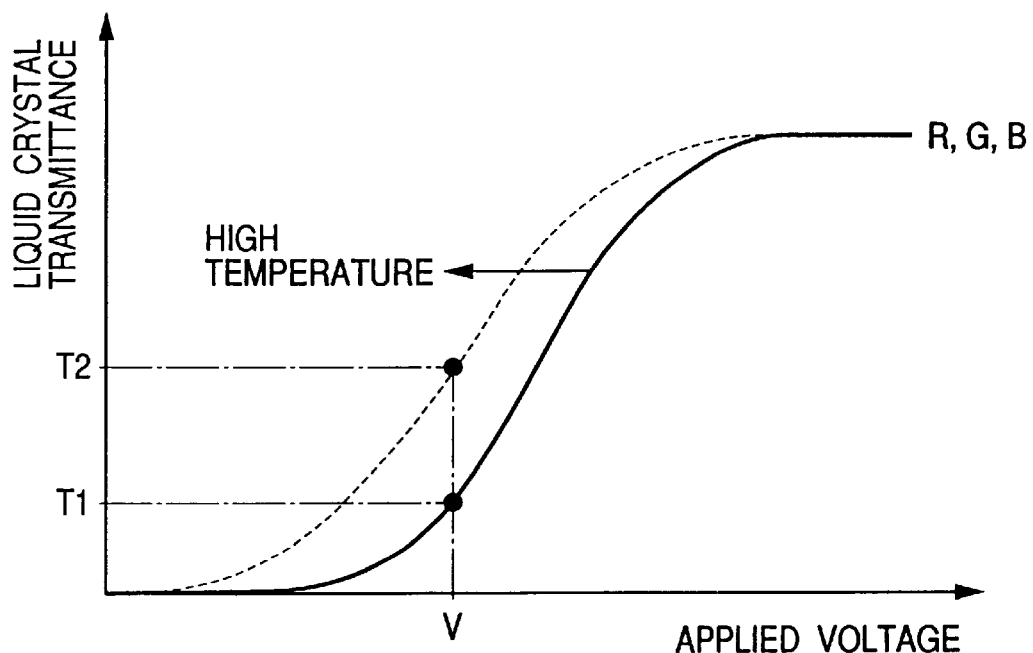
FIG. 6 is a graph showing the relationship between the liquid crystal transmittance of a light valve and the voltage applied thereto.

FIGS. 3, 4A and 4B show a third embodiment of the invention.

In this embodiment, three liquid crystal light valves are arranged on a sheet bent in a zig-zag fashion for a projection type liquid crystal display apparatus.

In this embodiment, cabinet 301 contains a light source comprising a light emitting tube, a reflectors and lenses and a total of six mirrors for separating the light from the light source into rays of light of R, G and B and combining them appropriately (including a B reflector mirror 303 for selectively reflecting B light, a first R reflector mirror 304 for selectively reflecting R light, a first reflector mirror 305, a second reflector mirror 306, a second R reflector mirror 307 for selectively reflecting R light and a G reflector mirror for 308 selectively reflecting G light).

The rays of light coming from the light source and separated into three different colors of R, G and B are modulated by three liquid crystal light valves 309, 310 and 311 and combined to produce an image, which is then enlarged by a lens group 312 and projected onto an external screen 313.

The light valves of R, G and B are connected with each other by way of a graphite sheet 314 to keep themselves to a same temperature level.

FIG. 4A shows the light valve 309 for R of FIG. 3 in greater detail. A liquid crystal panel 315 produced by bonding a pair of glass plates is held in contact with the graphite sheet by means of a panel holder 316 made of an aluminum plate. On the other hand, the panel holder 316 is rigidly anchored to a predetermined position in the cabinet 301 of FIG. 3. Note that, the holder frame 317 of the light valve and the panel holder 316 are put together by way of a thermal insulation member 318 typically made of a thermally insulating resin material to prevent heat in the panel holder 316 from flowing abundantly into the cabinet 301 having a large heat capacity. It should be understood that this consideration for the above conduction of heat is very important to realize a same temperature level for the three light valves of the apparatus in an effective way. For designing the thermal behavior of the apparatus, all the materials and the profiles of the components that are connected with each other have to be taken into consideration so as to select materials and structures for the components that can make the light valves come to show a same temperature level in a minimal period of time.

FIG. 4B is a plan view of the light valve of FIG. 4A. Since the liquid crystal of this embodiment is of the transmission type, the graphite sheet 314 and the holder 316 having an opening, or an image passing region 319, necessary for displaying images. To realize a uniform temperature level, all the components are preferably covered by a thermally highly conductive material except the display region.

The graphite sheet 314 of this embodiment is "Panasonic Graphite Sheet" as in the case of the first embodiment. This sheet 314 is easily processible and thermally highly conductive to meet the requirements of the invention, although a copper sheet can also satisfactorily be used for this embodiment.

In this embodiment of liquid crystal display apparatus, the temperature of all the liquid crystal light valves is controlled to ambient temperature +(10° C.±1° C.) in normal operation so that no color distortions will be visually observed on the image displayed on the screen of the display apparatus throughout its display operation.

While the light valves of this embodiment comprise TN liquid crystal, the latter may be replaced by polymer network type liquid crystal, ferroelectric liquid crystal, or anti-ferroelectric liquid crystal to be used for a transmission type liquid crystal display apparatus.

Note that liquid crystal light valves showing a relationship between the liquid crystal transmittance and the applied voltage that shifts sensitively as a function of temperature change can be used effectively for the purpose of the invention.

[Advantages of the Invention]

As described above in detail, in a projection type liquid crystal display apparatus according to the invention and comprising a plurality of liquid crystal light valves, the light valves are connected with each other by means of a high thermal conductivity member to make them show a same temperature level within a short period of time under any conditions and consequently eliminate any color distortions due to a temperature difference that can otherwise exists among the light valves.

Particularly, when the high thermal conductivity member is made of sheet metal or a sheet of a polymer material having a high thermal conductivity, the above effect of the invention can be realized at low cost without requiring a large space.

What is claimed is:

1. A projection type liquid crystal display apparatus comprising:

a plurality of liquid crystal light valves; and a light source for emitting light to the light valves, wherein a plurality of different beams of light modulated respectively by the plurality of liquid crystal light valves are projected and focused to display images, said plurality of liquid crystal light valves are connected to each other by way of a high thermal conductivity member, the high thermal conductivity member being a sheet member.

2. A projection type liquid crystal display apparatus according to claim 1, wherein the high thermal conductivity member has a U-shaped profile with three sides, and three light valves are respectively arranged on the three sides of the high thermal conductivity member.

3. A projection type liquid crystal display apparatus according to claim 1, wherein the high thermal conductivity member has a Z-shaped zig-zag profile with three sides, and three light valves are respectively arranged on the three sides of the high thermal conductivity member.

4. A projection type liquid crystal display apparatus according to claim 1, wherein the light from said light source is divided into rays of light of three colors of red (R), green (G) and blue (B) by a reflective spectral optical system, the rays of light of the three colors being modulated respectively by the three light valves and combined to produce and display an image by means of an optical system.

5. A projection type liquid crystal display apparatus comprising:

a plurality of liquid crystal light valves; and a light source for emitting light to the light valves, wherein a plurality of different beams of light modulated respectively by the plurality of liquid crystal light valves are projected and focused to display images, said plurality of liquid crystal light valves are connected to each other by way of a high thermal conductivity member, the high thermal conductivity member being made of graphite.

6. A projection type liquid crystal display apparatus comprising:

a plurality of liquid crystal light valves; and a light source for emitting light to the light valves, wherein a plurality of different beams of light modulated respectively by the plurality of liquid crystal light valves are projected and focused to display images, said plurality of liquid crystal light valves are connected to each other by way of a high thermal conductivity member, the high thermal conductivity member being made of copper.

7. A projection type liquid crystal display apparatus comprising:

a plurality of liquid crystal light valves: and a light source for emitting light to the light valves, wherein a plurality of different beams of light modulated respectively by the plurality of liquid crystal light valves are projected and focused to display images, said plurality of liquid crystal light valves are connected to each other by way of a high thermal conductivity member, the high thermal conductivity member being made of aluminum.

8. A projection type liquid crystal display apparatus comprising:

a plurality of liquid crystal light valves; and a light source for emitting light to the light valves, wherein a plurality of different beams of light modulated respectively by the plurality of liquid crystal light valves are projected and focused to display images, said plurality of liquid crystal light valves are connected to each other by way of a high thermal conductivity member, the high thermal conductivity member being made of stainless steel.

9. A projection type liquid crystal display apparatus comprising:

a plurality of liquid crystal light valves; and a light source for emitting light to the light valves, wherein a plurality of different beams of light modulated respectively by the plurality of liquid crystal light valves are projected and focused to display images, said Plurality of liquid crystal light valves are connected to each other by way of a high thermal conductivity member, the high thermal conductivity member being made of metal.

* * * * *

UNITED STATES PATENT AND TRADEMARK OFFICE
CERTIFICATE OF CORRECTION

PATENT NO.    : 6,025,889
DATED         : February 15, 2000
INVENTOR(S)   : SHUNSUKE INOUE It is certified that error appears in the above-identified patent and that said Letters Patent is hereby corrected as shown below:

COLUMN 1

Line 20, "and" should read --and are--; and
    Line 36, "for 108" should read --108 for--.

COLUMN 2

Line 46, "valve" should read --valves--.

COLUMN 3

Line 63, "before" should read --before being--.

COLUMN 4

Line 30, "rise" should read --rise to--.

COLUMN 5

Line 39, "a reflectors" should read --reflectors--.

UNITED STATES PATENT AND TRADEMARK OFFICE
CERTIFICATE OF CORRECTION

PATENT NO.   : 6,025,889
DATED        : February 15, 2000
INVENTOR(S)  : SHUNSUKE INOUE It is certified that error appears in the above-identified patent and that said Letters Patent is hereby corrected as shown below:

COLUMN 6

Line 47, "exists" should read --exist--.

Signed and Sealed this

Twentieth Day of March, 2001

Attest:

NICHOLAS P. GODICI

*Attesting Officer*     Acting Director of the United States Patent and Trademark Office